(12) United States Patent
Li

(10) Patent No.: US 10,472,111 B2
(45) Date of Patent: Nov. 12, 2019

(54) LOCKING MECHANISM FOR LOCKING A FLOATING PLATFORM LOADED WITH A MACHINE ONTO A BASE, SHOCK ABSORBING DEVICE WITH LOCKING MECHANISM, AND METHOD THEREOF

(71) Applicant: Wistron Corporation, New Taipei (TW)

(72) Inventor: Chuan-Sheng Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/654,715

(22) Filed: Jul. 20, 2017

(65) Prior Publication Data

US 2018/0194502 A1 Jul. 12, 2018

(30) Foreign Application Priority Data

Jan. 10, 2017 (TW) .............................. 106100688 A

(51) Int. Cl.
*E04F 15/18* (2006.01)
*E04B 1/98* (2006.01)
*B65B 55/20* (2006.01)
*E04F 15/22* (2006.01)
*E04F 15/02* (2006.01)
(Continued)

(52) U.S. Cl.
CPC ................ *B65B 55/20* (2013.01); *E04B 1/98* (2013.01); *E04F 15/02194* (2013.01); *E04F 15/18* (2013.01); *E04F 15/225* (2013.01); *B23Q 1/0054* (2013.01); *B64D 9/003* (2013.01); *E01C 2301/40* (2013.01)

(58) Field of Classification Search
CPC ........ B65B 55/20; E04F 15/225; E04F 15/18; E04F 15/02194; B64D 9/003; E04B 1/98; E01C 2301/40; B23Q 1/0054
USPC ................ 248/677, 680, 638, 645, 673, 672
See application file for complete search history.

(56) References Cited

U.S. PATENT DOCUMENTS 2,289,854 A * 7/1942 Permann ................... B60N 2/40
248/595
4,710,045 A * 12/1987 Lim .......................... B41J 1/30
248/27.3
(Continued)

FOREIGN PATENT DOCUMENTS

TW M246282 10/2004

*Primary Examiner* — Phi D A
(74) *Attorney, Agent, or Firm* — Winston Hsu

(57) ABSTRACT

A shock absorbing device includes a floating platform, a base, and at least three locking mechanisms. The floating platform is movably spaced above the base and loaded with a machine. A center of gravity of the floating platform and the machine is located within a field enclosed by the at least three locking mechanisms. Each of the at least three locking mechanisms includes a first fixing component, a second fixing component, and a third fixing component. The first fixing component is disposed on the floating platform. The second fixing component is disposed on the base and located at a position corresponding to the first fixing component. The third fixing component is disposed on the second fixing component to engage with the first fixing component, so that the floating platform can be locked onto the base, which prevents damage of internal components of the machine caused by shock loads during transportation.

14 Claims, 6 Drawing Sheets

(51) Int. Cl.
*B64D 9/00* (2006.01)
*B23Q 1/00* (2006.01)

(56) References Cited

U.S. PATENT DOCUMENTS

| | | | | | |
|---|---|---|---|---|---|
| 5,178,357 | A | * | 1/1993 | Platus | F16F 3/026 248/619 |
| 5,215,417 | A | * | 6/1993 | Ball | B23C 5/26 409/232 |
| 5,242,147 | A | * | 9/1993 | Kemeny | F16F 7/08 248/635 |
| 5,306,121 | A | * | 4/1994 | Heflin | F04B 39/0044 248/638 |
| 5,566,156 | A | * | 10/1996 | Choi | G11B 17/0434 360/99.06 |
| 5,669,594 | A | * | 9/1997 | Platus | F16F 3/026 248/619 |
| 5,718,090 | A | * | 2/1998 | Wei-Hwang | E04C 5/122 24/122.6 |
| 6,252,768 | B1 | * | 6/2001 | Lin | G06F 1/1616 248/624 |
| 6,254,068 | B1 | * | 7/2001 | Chen | F16F 15/02 248/638 |
| 7,188,993 | B1 | * | 3/2007 | Howe | B01F 11/0031 366/111 |
| 7,744,050 | B2 | * | 6/2010 | de Toledo | A47L 15/4253 248/188.3 |
| 8,480,052 | B2 | * | 7/2013 | Taylor | F16F 15/067 248/563 |
| 8,579,242 | B2 | * | 11/2013 | Huang | F16M 11/10 248/157 |
| 2003/0038005 | A1 | * | 2/2003 | Folkens | F16F 9/16 188/380 |
| 2004/0036002 | A1 | * | 2/2004 | Meisel | E04H 9/021 248/638 |
| 2005/0258331 | A1 | * | 11/2005 | Chi | F16F 3/10 248/638 |
| 2006/0023416 | A1 | * | 2/2006 | Chen | G06F 1/1613 361/679.4 |
| 2011/0033179 | A1 | * | 2/2011 | Sasaki | G03B 17/00 396/427 |
| 2012/0074292 | A1 | * | 3/2012 | Schroder | B66C 23/62 248/677 |

* cited by examiner

LOCKING MECHANISM FOR LOCKING A FLOATING PLATFORM LOADED WITH A MACHINE ONTO A BASE, SHOCK ABSORBING DEVICE WITH LOCKING MECHANISM, AND METHOD THEREOF

BACKGROUND OF THE INVENTION

1. Field of the Invention

The present disclosure relates to a locking mechanism and a shock absorbing device, and more particularly, to a locking mechanism for locking a floating platform loaded with a machine onto a base, a shock absorbing device with the locking mechanism, and a method thereof.

2. Description of the Prior Art

With advance of technology, requirement for precision of a machine, especially for a medical apparatus, becomes higher. Shock loads during operation may affect light paths of optical components inside the medical apparatus and reduce precision of detection. In order to prevent the precision of detection from being affected by the shock loads during operation, some machines are equipped with dampers for absorbing shock loads during operation. The dampers and the machines are usually assembled and calibrated in advance before transportation for reducing manufacturing cost. However, shock loads during transportation are much greater than the shock loads during operation. Therefore, the dampers cannot effectively absorb the shock loads during transportation but amplify the shock loads during transportation, so that internal components of the machine may be displaced from originals positions and damaged due to collision. Besides, after the machine arrives at destination, it has to calibrate the machine again or replace damaged components, which increases manufacturing cost.

SUMMARY OF THE INVENTION

Therefore, it is an objective of the present disclosure to provide a locking mechanism, a shock absorbing device with the locking mechanism, and a method thereof for solving the aforementioned problems.

In order to achieve the aforementioned objective, the present disclosure discloses a locking mechanism for locking a floating platform loaded with a machine onto a base. The locking mechanism includes a first fixing component, a second fixing component, and a third fixing component. The first fixing component is disposed on the floating platform. The second fixing component is disposed on the base and located at a position corresponding to the first fixing component. The third fixing component is disposed on the second fixing component and for engaging with the first fixing component to lock the floating platform onto a side of the base.

According to an embodiment of the present disclosure, the locking mechanism further includes at least one first fastening component for fixing the first fixing component onto the floating platform.

According to an embodiment of the present disclosure, a receiving slot is formed on the floating platform for receiving the first fixing component, so as to prevent an interference between the first fixing component and the machine.

According to an embodiment of the present disclosure, the locking mechanism further includes at least one second fastening component for fixing the second fixing component onto the base.

According to an embodiment of the present disclosure, an end of the second fixing component extends toward an interior of the floating platform to abut against the floating platform.

According to an embodiment of the present disclosure, the first fixing component is a nut component. The second fixing component is a sleeve component. The third fixing component is a bolt component. The first fixing component is fixed onto the floating platform. The second fixing component is fixed onto the base and located at the position corresponding to the first fixing component, and the third fixing component passes through the second fixing component to screw with the first fixing component for locking the floating platform onto the side of the base.

In order to achieve the aforementioned objective, the present disclosure further discloses a shock absorbing device loaded with a machine. The shock absorbing device includes a floating platform, a base, a plurality of resilient components, and at least three locking mechanisms. The floating platform is loaded with the machine. The base is spaced from the floating platform. The plurality of resilient components is disposed between the floating platform and the base. A gravity center of the floating platform and the machine is located within a field enclosed by the at least three locking mechanisms. Each of the at least three locking mechanisms includes a first fixing component, a second fixing component, and a third fixing component. The first fixing component is fixed onto the floating platform. The second fixing component is fixed onto the base and located at a position corresponding to the first fixing component. The third fixing component passes through the second fixing component to engage with the first fixing component for locking the floating platform onto a side of the base.

In order to achieve the aforementioned objective, the present disclosure further discloses a method of utilizing at least three locking mechanisms for locking a floating platform loaded with a machine. The method includes fixing first fixing components of the at least three locking mechanisms onto the floating platform according to a gravity center of the floating platform and the machine, so as to locate the gravity center within a field enclosed by the first fixing components of the at least three locking mechanisms, fixing second fixing components of the at least three locking mechanisms onto abase and at positions corresponding to the corresponding first fixing components, and disposing third fixing components of the at least three locking mechanisms through the corresponding second fixing components to engage with the corresponding first fixing components, so as to lock the floating platform onto a side of the base.

According to an embodiment of the present disclosure, the method further includes utilizing first fastening components for fixing the first fixing components of the at least three locking mechanisms onto the floating platform.

According to an embodiment of the present disclosure, the method further includes utilizing second fastening components for fixing the second fixing components of the at least three locking mechanisms onto the base.

According to an embodiment of the present disclosure, the method further includes installing a plurality of resilient components between the floating platform and the base.

In summary, the shock absorbing device of the present disclosure utilizes engagement and disengagement of the third fixing component and the first fixing component for restraining and allowing displacement of the floating platform relative to the base. Therefore, the present disclosure has advantages of simple structure and easy operation. When the machine is transported, the shock absorbing device can be acted as a transportation carrier, and the gravity center of the floating platform and the machine is located within the field enclosed by the locking mechanisms. Therefore, the displacement of the floating platform relative to the base can be effectively restrained by the locking mechanisms, so that the machine cannot vibrate easily, which effectively prevents internal components from being damaged and ensures precise installation of the internal components. When the machine arrives at destination, the floating platform and the base can be released by operating the third fixing component from the bottom of the base, so that the shock absorbing device can absorb shock load during operation by the resilient components installed between the floating platform and the base, which prevents the machine from being affected by the shock load during operation.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
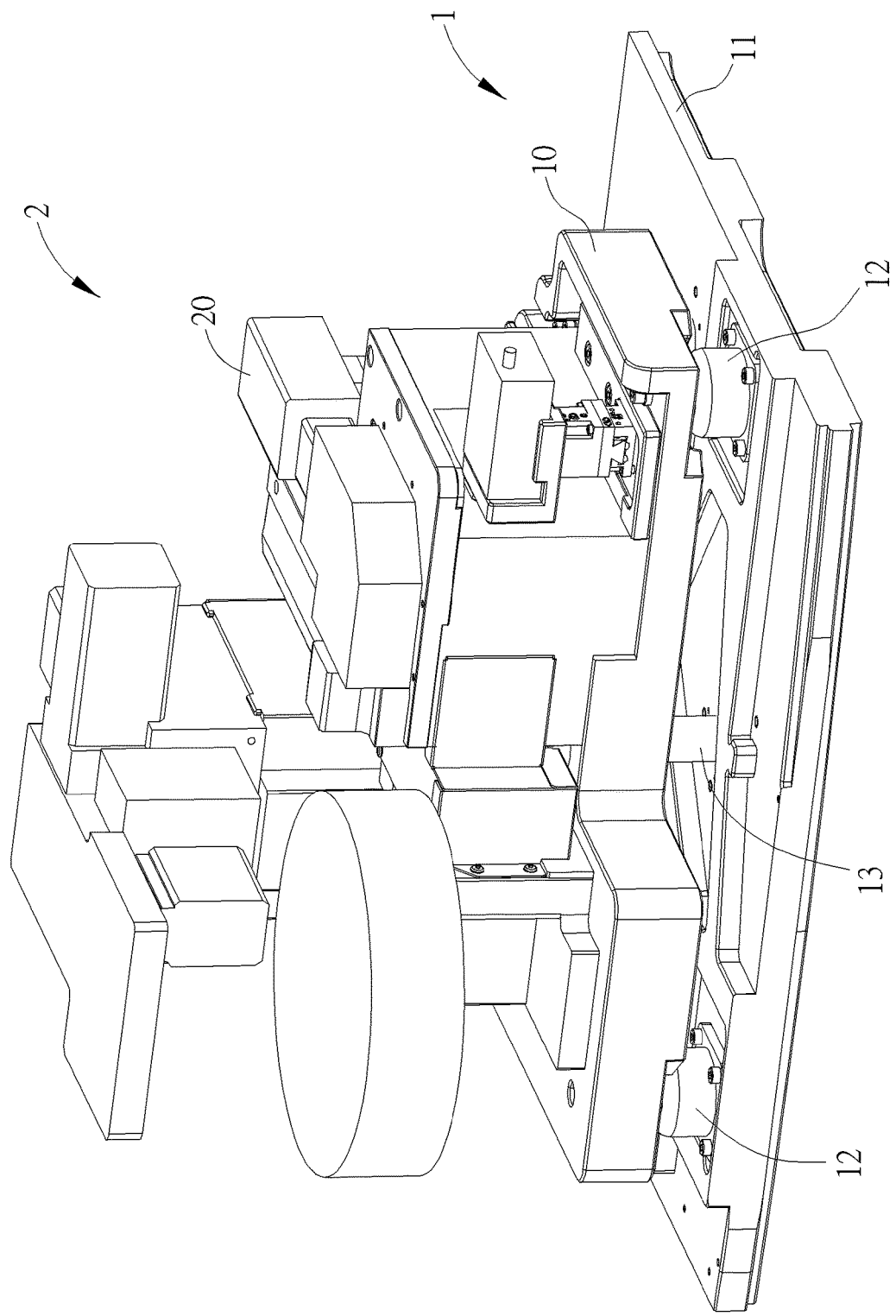
FIG. 1 is a schematic diagram of a shock absorbing device according to an embodiment of the present disclosure.
Figure 2:
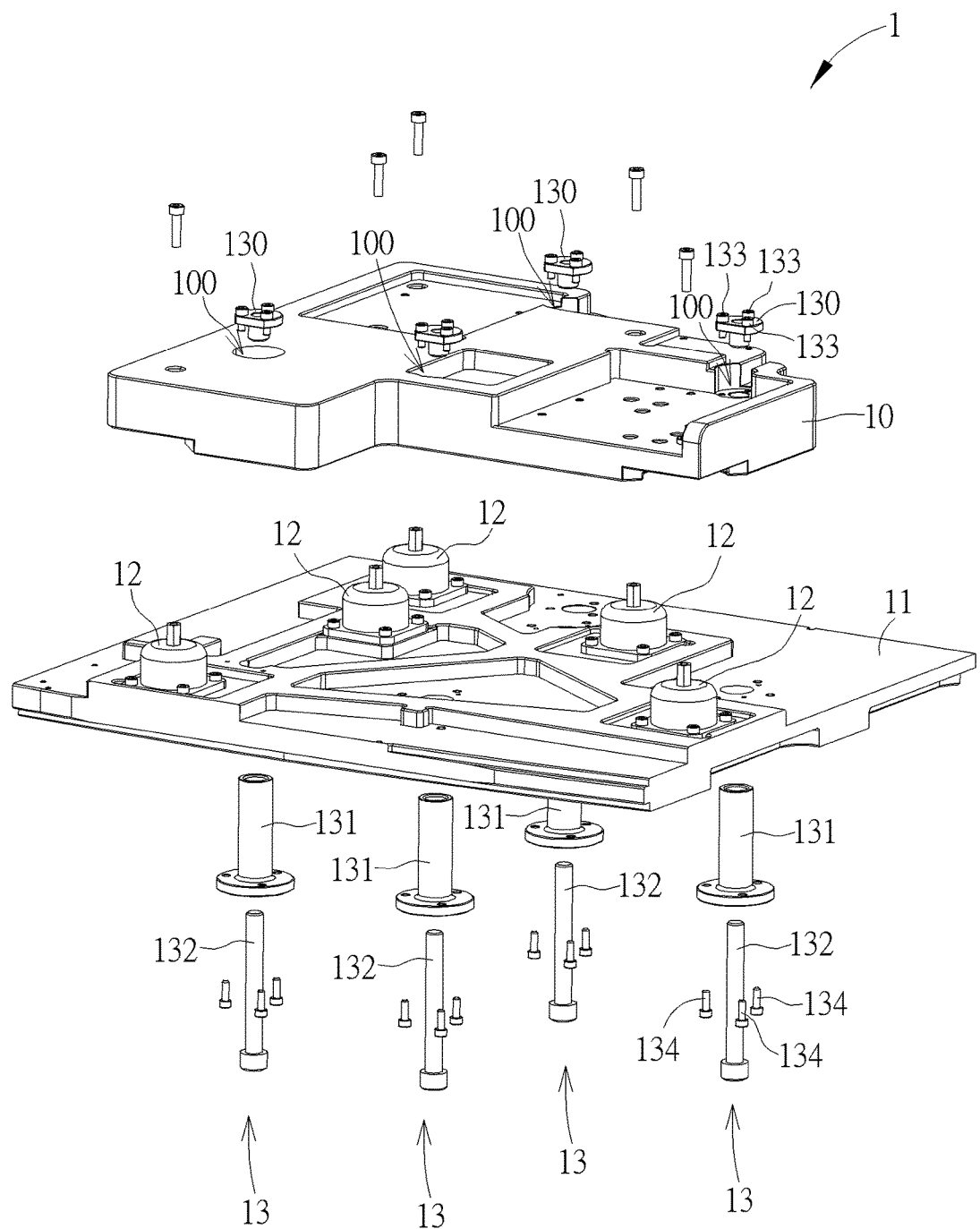
FIG. 2 is an exploded diagram of the shock absorbing device according to the embodiment of the present disclosure.
Figure 3:
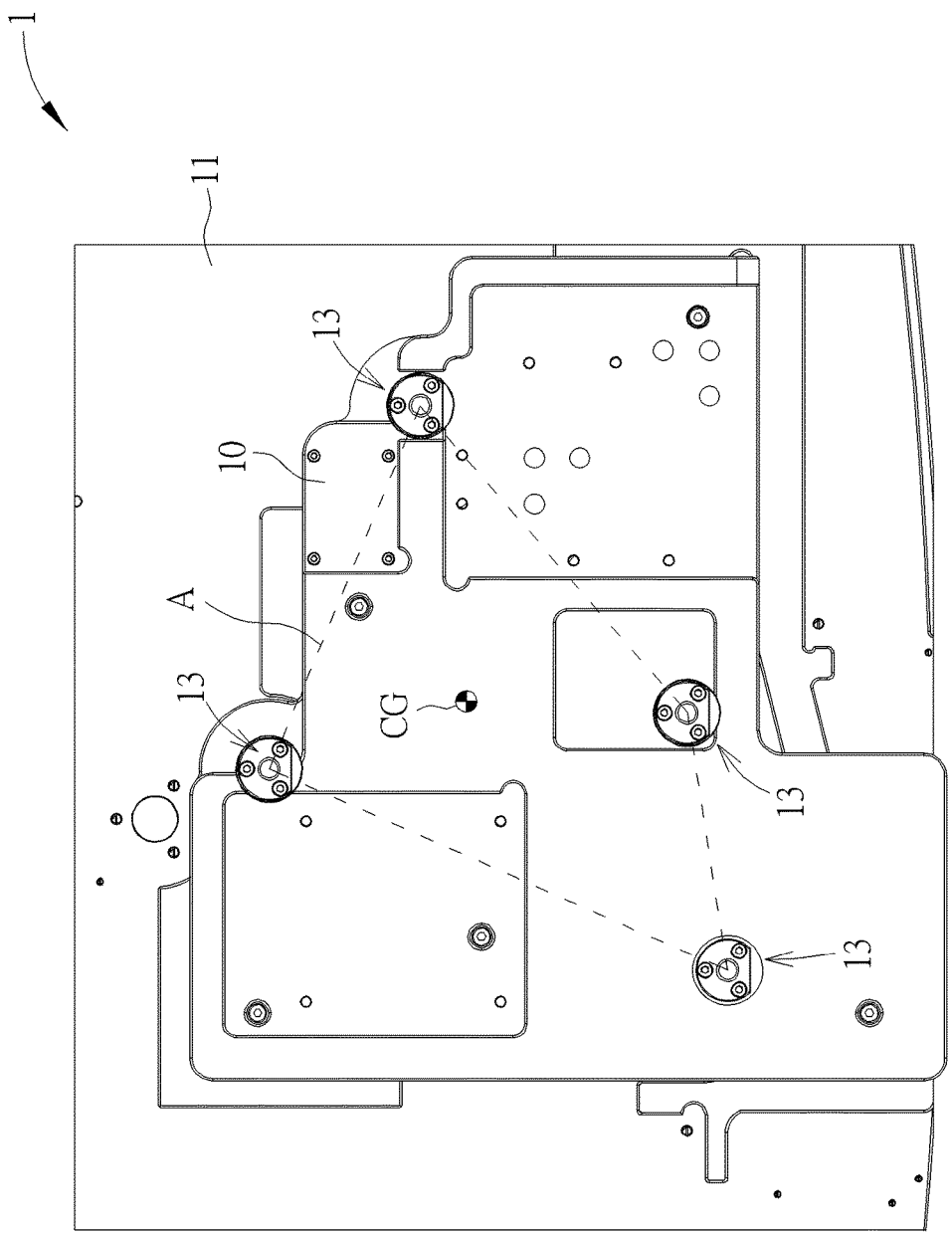
FIG. 3 is a top view diagram of the shock absorbing device according to the embodiment of the present disclosure.

Please refer to FIG. 1 to FIG. 3. FIG. 1 is a schematic diagram of a shock absorbing device 1 according to an embodiment of the present disclosure. FIG. 2 is an exploded diagram of the shock absorbing device 1 according to the embodiment of the present disclosure. FIG. 3 is a top view diagram of the shock absorbing device 1 according to the embodiment of the present disclosure. As shown in FIG. 1, the shock absorbing device 1 is loaded with a machine 2 and capable of absorbing shock loads during transportation and operation, so as to ensure precision of the machine 2 and prevent internal components from be damaged due to collision. In this embodiment, the machine 2 can be an optical machine or a medical apparatus including an optical module 20. The shock absorbing device 1 can absorb shock loads for preventing a light path of the optical module 20 from being deviated, so as to ensure precision of detection. However, it is not limited thereto.

As shown in FIG. 2, the shock absorbing device 1 includes a floating platform 10, a base 11, five resilient components 12, and four locking mechanisms 13. The floating platform 10 is loaded with the machine 2. The base 11 is spaced from the floating platform 10. The five resilient components 12 are disposed between the floating platform 10 and the base 11. The four locking mechanisms 13 can selectively allow or restrain displacement of the floating platform 10 relative to the base 11. The five resilient components 12 are for absorbing the shock loads during operation, which prevents the machine 2 from being affected by the shock loads during operation. In this embodiment, each of the five resilient components 12 can be a spring component. Furthermore, the five resilient components 12 can have different elastic coefficients and be arranged according to weight of the machine 2.

It should be noticed that, in this embodiment, positions of the four locking mechanisms 13 can be arranged according to a position of a gravity center CG of the floating platform 10 and the machine 2. Specifically, as shown in FIG. 3, the gravity center CG of the floating platform 10 and the machine 2 is located within a field A enclosed by the four locking mechanisms 13 for achieving a better locking effect. However, the numbers and the configurations of the resilient component 12 and the locking mechanism 13 are not limited to those illustrated in figures of this embodiment. In other words, all configurations that enable the gravity center CG to be located within the field A enclosed by the locking mechanisms 13 are within the scope of the present disclosure.

Figure 4:
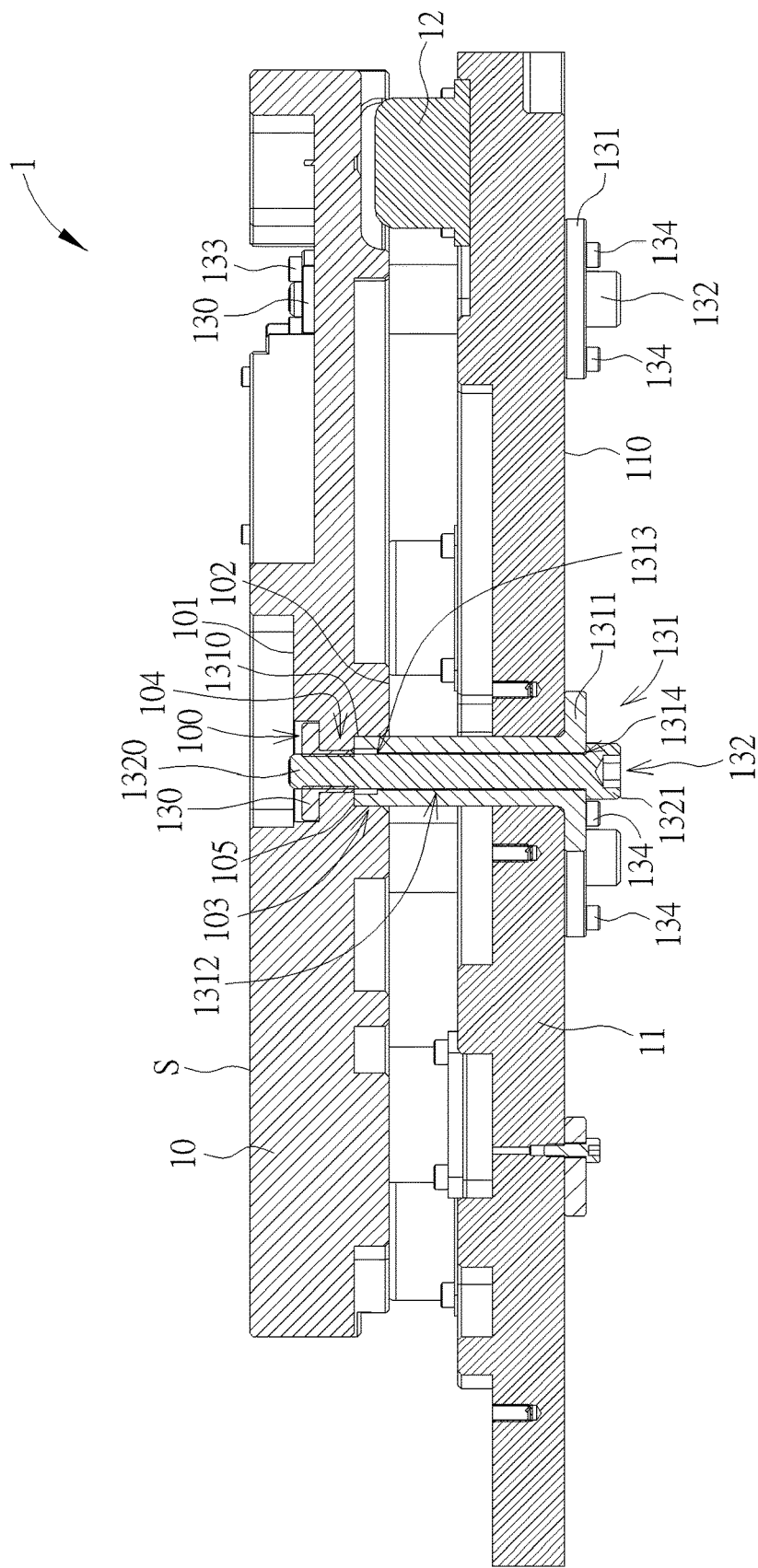
FIG. 4 is a sectional diagram of the shock absorbing device according to the embodiment of the present disclosure.

Please refer to FIG. 2 to FIG. 4. FIG. 4 is a sectional diagram of the shock absorbing device 1 according to the embodiment of the present disclosure. As shown in FIG. 2 to FIG. 4, each of the four locking mechanisms 13 includes a first fixing component 130, a second fixing component 131, and a third fixing component 132. In this embodiment, the first fixing component 130, the second fixing component 131, and the third fixing component 132 can be a nut component, a sleeve component, and a bolt component, respectively. However, it is not limited thereto. The four first fixing components 130 are fixed onto the floating platform 10 and arranged according to the position of the gravity center CG of the floating platform 10 and the machine 2, so that the gravity center CG of the floating platform 10 and the machine 2 is located within the field A enclosed by the four first fixing components 130, i.e., the four locking mechanisms 13. The four second fixing components 131 are fixed onto the base 11 and located at positions corresponding to the four first fixing components 130. An end 1310 of each of the four second fixing components 131 passes through the base 11 to extend toward an interior of the floating platform 10 for abutting against the floating platform 10. The four third fixing components 132 pass through the four second fixing components 131 to engage with the four first fixing components 130 for locking the floating platform 10 onto a side of the base 11.

Specifically, in this embodiment, four receiving slots 100 are formed on a side 101 of the floating platform 10 away from the base 11. Each of the four locking mechanisms 13 further includes three first fastening components 133 and three second fastening components 134. The three first fastening components 133 are for fixing the first fixing component 130 inside the receiving slot 100 on the floating platform 10. The receiving slot 100 prevents the first fixing component 130, the third fixing component 132, and the first fastening components 133 from protruding from a contacting surface S, which avoids an interference between the machine 2 and the aforementioned components. Furthermore, four recesses 103 are formed on a side 102 of the floating platform 10 facing the base 11. Each of the four recesses 103 communicates with the corresponding receiving slot 100 via a communicating slot 104. An inner diameter of the communicating slot 104 is less than an inner diameter of the recess 103, so that a wall 105 is formed on a connection between the communicating slot 104 and the recess 103. The second fixing component 131 passes through the base 11 from the bottom of the base 11 and into the recess 103 so that the end 1310 of the second fixing component 131 abuts against the wall 105. The other end 1311 of the second fixing component 131 is exposed on a side 110 of the base 11 away from the floating platform 10. The three second fastening components 134 are for fixing the other end 1311 of the second fixing component 131 onto the side 110 of the base 11 away from the floating platform 10. Furthermore, a through hole 1312 is formed on the second fixing component 131. The through hole 1312 penetrates the second fixing component 131, so as to form two openings 1313, 1314 on the end 1310 and the other end 1311 of the second fixing component 131. An end 1320 of the third fixing component 132 passes through the opening 1314, the through hole 1312, the opening 1313, and the communicating slot 104 to engage with the first fixing component 130. The other end 1321 of the third fixing component 132 abuts against an outer side of the end 1310 of the second fixing component 131 because an outer diameter of the other end 1321 of the third fixing component 132 is greater than an inner diameter of the opening 1314. In such a way, when the shock absorbing device 1 is acted by a shock load, the first fixing component 130 and the third fixing component 132 engaging with each other and the second fixing component 131 can provide a corresponding resistance force for preventing the floating platform 10 and the base 11 from getting close or away.

However, the numbers of the first fastening component 133 and the second fastening component 134 are not limited to this embodiment. It depends on practical demands. Furthermore, the fixing mechanisms between the first fixing component 130 and the floating platform 10 and between the second fixing component 131 and the base 11 are not limited to this embodiment. For example, in another embodiment, the first fastening component 133 can be omitted. The first fixing component 130 can be fixed onto the floating platform 10 by welding or other fixing mechanisms. Besides, preferably, a thickness of the first fixing component 130 and lengths of the second fixing component 131 and the third fixing component 132 can be determined according to thicknesses of the floating platform 10 and the base 11 and a distance between the floating platform 10 and the base 11, so that the distance between the floating platform 10 and the base 11 will not be decreased when the third fixing component 132 engages with the first fixing component 130, which prevents the resilient components 12 from being deformed permanently.

Figure 5:
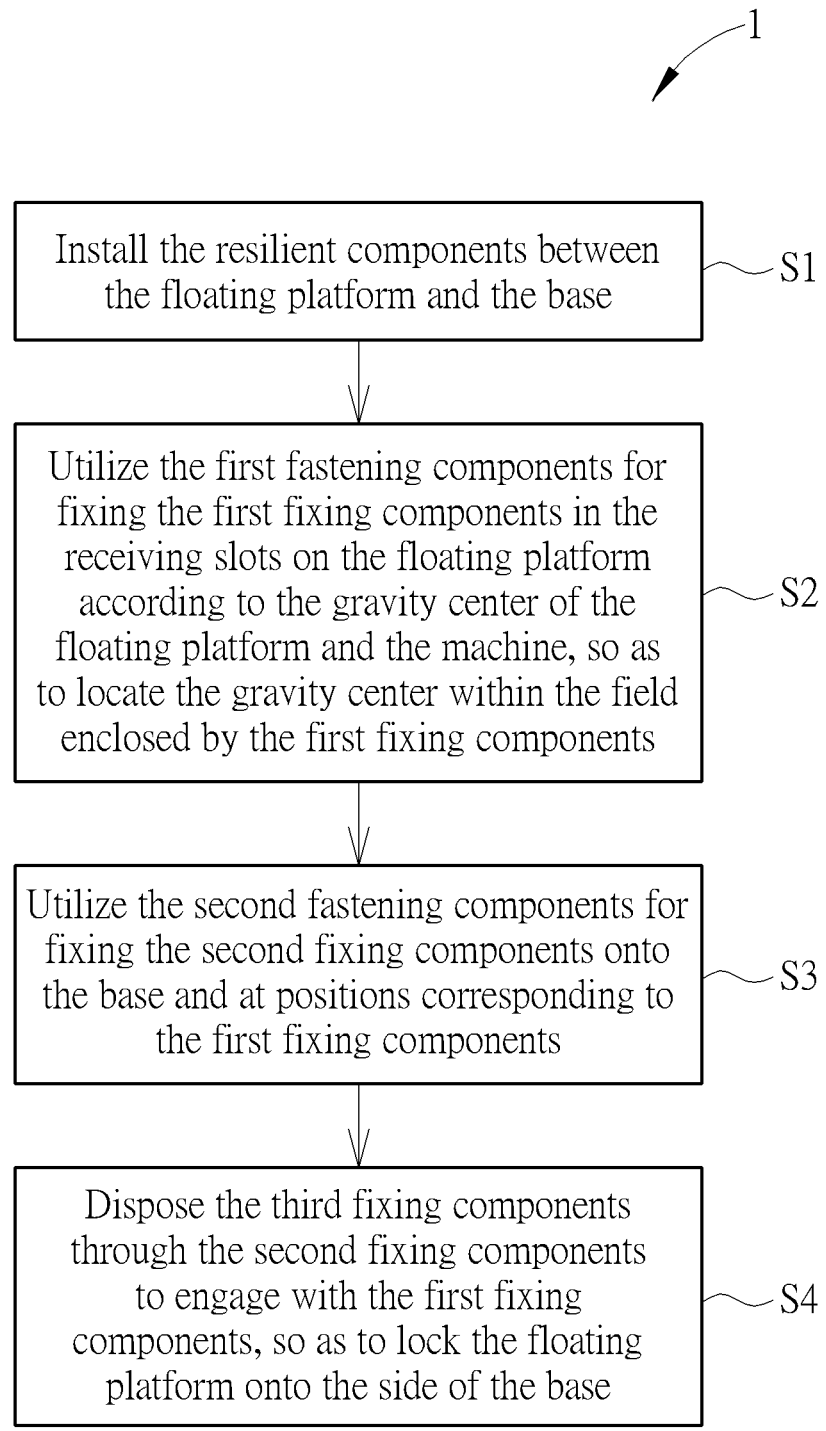
FIG. 5 is a flowchart diagram of a method of utilizing locking mechanisms for locking a floating platform onto a base according to the embodiment of the present disclosure.

Please refer to FIG. 5. FIG. 5 is a flowchart diagram of a method of utilizing the locking mechanisms 13 for locking the floating platform 10 onto the base 11 according to the embodiment of the present disclosure. The method includes the following steps.

S1: Install the resilient components 12 between the floating platform 10 and the base 11.

S2: Utilize the first fastening components 133 for fixing the first fixing components 130 in the receiving slots 100 on the floating platform 10 according to the gravity center CG of the floating platform 10 and the machine 2, so as to locate the gravity center CG within the field A enclosed by the first fixing components 130.

S3: Utilize the second fastening components 134 for fixing the second fixing components 131 onto the base 11 and at positions corresponding to the first fixing components 130.

S4: Dispose the third fixing components 132 through the second fixing components 131 to engage with the first fixing components 130, so as to lock the floating platform 10 onto the side of the base 11.

Figure 6:
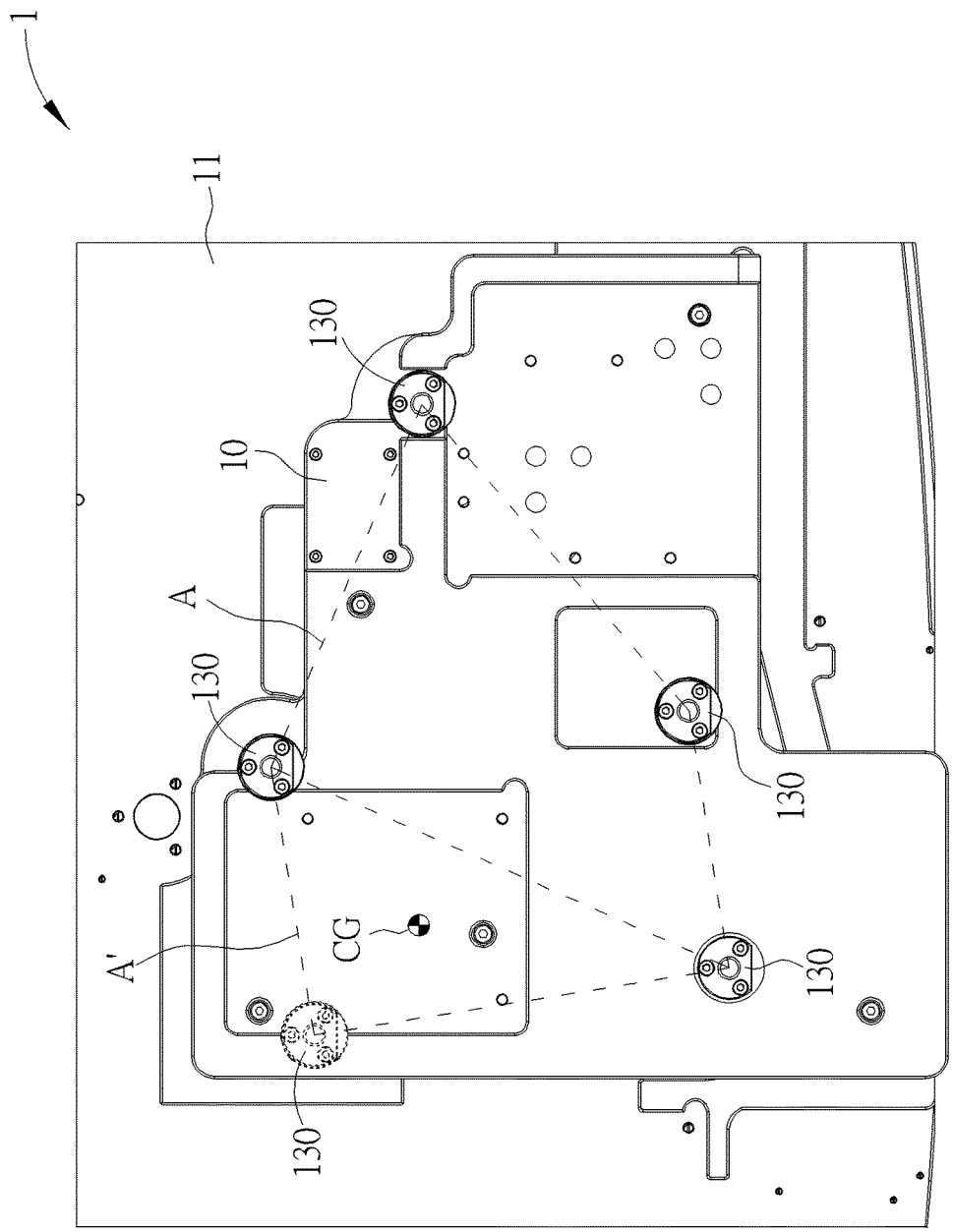
FIG. 6 is a diagram illustrating a gravity center of the floating platform and a machine located outside a field enclosed by first fixing components according to the embodiment of the present disclosure.

More detailed description for the steps of the method is provided as follows. Please refer to FIG. 1 to FIG. 5. When the shock absorbing device 1 is used for transporting the machine 2 as a transportation carrier, the resilient components 12 can be installed between the floating platform 10 and the base 11 (step S1). The first fixing components 130 can be fixed in the receiving slots 100 on the floating platform 10 by the first fastening components 133 according to the gravity center CG of the floating platform 10 and the machine 2, so as to locate the gravity center CG within the field A enclosed by the first fixing components 130 (step S2). Please refer to FIG. 6. FIG. 6 is a diagram illustrating the gravity center CG of the floating platform 10 and the machine 2 located outside the field A enclosed by the first fixing components 130 according to the embodiment of the present disclosure. As shown in FIG. 6, when the gravity center CG of the floating platform 10 and the machine 2 is located outside the field A enclosed by the four first fixing components 130, which are illustrated by solid lines, users can adjust positions of the four first fixing components 130 or add an additional first fixing component 130, which is illustrated by a dash line, so as to locate the gravity center CG within another field A' enclosed by the five first fixing components 130.

Afterwards, the second fixing components 131 can be fixed onto the base 11 by the second fastening components 134 and at positions corresponding to the first fixing components 130 (step S3). As shown in FIG. 4, the end 1310 of the second fixing component 131 can pass through the base 11 to extend toward the interior of the floating platform 10 for abutting against the floating platform 10. The other end 1311 can be fixed onto the base 11 by the second fastening components 134. Finally, the third fixing components 132 can pass through the second fixing components 131 to engage with the first fixing components 130, so as to lock the floating platform 10 onto the side of base 11 (step 4). Since the gravity center CG of the floating platform 10 and the machine 2 is located within the field A enclosed by the locking mechanisms 13, displacement of the floating platform 10 relative to the base 11 can be restrained by the locking mechanisms 13 effectively. Therefore, the machine 2 will not be driven to vibrate by shock loads during transportation easily, which can effectively prevent internal components of the machine 2 from being damaged and ensure precise installation of the internal components of the machine 2.

When the machine 2 arrives at destination, the floating platform 10 and the base 11 can be unlocked easily by disengagement of the third fixing components 132 and the first fixing components 130 from the bottom of the base 11. At this moment, the shock absorbing device 1 can be used as an operational carrier and capable of absorbing shock loads during operation by the resilient components 12 installed between the floating platform 10 and the base 11, which prevents the machine 2 from being affected by the shock load during operation. Furthermore, when it is desired to transport the machine 2 again, it only has to operate the third fixing components 132 to pass through the second fixing components 131 to engage with the first fixing components 130. The floating platform 10 can be locked onto the base 11 again for transporting the machine 2. In other words, when the first fixing components 130 and the second fixing components 131 are respectively fixed on the floating platform 10 and the base 11, the floating platform 10 and the base 11 can be locked or unlocked by engagement or disengagement of the third fixing components 132 and the first fixing components 130 easily.

In contrast to the prior art, the shock absorbing device of the present disclosure utilizes engagement and disengagement of the third fixing component and the first fixing component for restraining and allowing displacement of the floating platform relative to the base. Therefore, the present disclosure has advantages of simple structure and easy operation. When the machine is transported, the shock absorbing device can be acted as the transportation carrier, and the gravity center of the floating platform and the machine is located within the field enclosed by the locking mechanisms. Therefore, the displacement of the floating platform relative to the base can be effectively restrained by the locking mechanisms, so that the machine cannot vibrate easily, which effectively prevents internal components from being damaged and ensures precise installation of the internal components. When the machine arrives at the destination, the floating platform and the base can be unlocked by operating the third fixing component from the bottom of the base, so that the shock absorbing device can absorb shock load during operation by the resilient components installed between the floating platform and the base, which prevents the machine from being affected by the shock load during operation.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A locking mechanism for locking a floating platform loaded with a machine onto a base, the locking mechanism comprising:
    a first fixing component disposed on the floating platform;
    a second fixing component fixedly disposed on the base and located at a position corresponding to the first fixing component; and
    a third fixing component disposed on the second fixing component and for engaging with the first fixing component to lock the floating platform onto a side of the base;
    wherein the first fixing component is a nut component, the second fixing component is a sleeve component, the third fixing component is a bolt component, the first fixing component is fixed onto the floating platform, the second fixing component is fixed onto the base and located at the position corresponding to the first fixing component, and the third fixing component passes through the second fixing component to screw with the first fixing component for locking the floating platform onto the side of the base.

2. The locking mechanism of claim 1, further comprising at least one first fastening component for fixing the first fixing component onto the floating platform.

3. The locking mechanism of claim 1, wherein a receiving slot is formed on the floating platform for receiving the first fixing component, so as to prevent an interference between the first fixing component and the machine.

4. The locking mechanism of claim 1, further comprising at least one second fastening component for fixing the second fixing component onto the base.

5. The locking mechanism of claim 1, wherein an end of the second fixing component extends toward an interior of the floating platform to abut against the floating platform.

6. A shock absorbing device loaded with a machine, the shock absorbing device comprising:
    a floating platform loaded with the machine;
    a base spaced from the floating platform;
    a plurality of resilient components disposed between the floating platform and the base; and
    at least three locking mechanisms, a gravity center of the floating platform and the machine being located within a field enclosed by the at least three locking mechanisms, each of the at least three locking mechanisms comprising:
        a first fixing component fixed onto the floating platform;
        a second fixing component fixed onto the base and located at a position corresponding to the first fixing component; and
        a third fixing component passing through the second fixing component to engage with the first fixing component for locking the floating platform onto a side of the base;
    wherein the first fixing component is a nut component, the second fixing component is a sleeve component, the third fixing component is a bolt component, the first fixing component is fixed onto the floating platform, the second fixing component is fixed onto the base and located at the position corresponding to the first fixing component, and the third fixing component passes through the second fixing component to screw with the first fixing component for locking the floating platform onto the side of the base.

7. The shock absorbing device of claim 6, wherein each of the at least three locking mechanisms further comprises at least one first fastening component for fixing the first fixing component of each of the at least three locking mechanisms onto the floating platform.

8. The shock absorbing device of claim 6, wherein at least three receiving slots are formed on the floating platform for receiving the first fixing components of the at least three locking mechanisms, so as to prevent interferences between the first fixing components of the at least three locking mechanisms and the machine.

9. The shock absorbing device of claim 6, wherein each of the at least three locking mechanisms further comprises at least one second fastening component for fixing the second fixing component of each of the at least three locking mechanisms onto the base.

10. The shock absorbing device of claim 6, wherein an end of the second fixing component of each of the at least three locking mechanisms extends toward an interior of the floating platform to abut against the floating platform.

11. A method of utilizing at least three locking mechanisms for locking a floating platform loaded with a machine, the method comprising:
- fixing first fixing components of the at least three locking mechanisms onto the floating platform according to a gravity center of the floating platform and the machine, so as to locate the gravity center within a field enclosed by the first fixing components of the at least three locking mechanisms;
- fixing second fixing components of the at least three locking mechanisms onto a base and at positions corresponding to the corresponding first fixing components; and
- passing third fixing components of the at least three locking mechanisms through the corresponding second fixing components to screw with the corresponding first fixing components, so as to lock the floating platform onto a side of the base;
- wherein the first fixing component is a nut component, the second fixing component is a sleeve component, the third fixing component is a bolt component.

12. The method of the claim 11, further comprising:
utilizing first fastening components for fixing the first fixing components of the at least three locking mechanisms onto the floating platform.

13. The method of the claim 12, further comprising:
utilizing second fastening components for fixing the second fixing components of the at least three locking mechanisms onto the base.

14. The method of the claim 11, further comprising:
installing a plurality of resilient components between the floating platform and the base.

* * * * *